(12) United States Patent
Kim et al.

(10) Patent No.: US 8,431,008 B2
(45) Date of Patent: Apr. 30, 2013

(54) ELECTROLYTIC DISINFECTION SYSTEM AND METHOD FOR PURIFYING WATER

(75) Inventors: Jae-eun Kim, Seoul (KR); Joo-wook Lee, Seoul (KR); Chang-hyun Kim, Seoul (KR); Hyo-rang Kang, Anyang-si (KR); Mi-jeong Song, Suwon-si (KR); Jae-young Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 260 days.

(21) Appl. No.: 12/859,548

(22) Filed: Aug. 19, 2010

(65) Prior Publication Data

US 2011/0100838 A1 May 5, 2011

(30) Foreign Application Priority Data

Oct. 30, 2009 (KR) ................. 10-2009-0104428

(51) Int. Cl.
 *C02F 1/46* (2006.01)
(52) U.S. Cl.
 USPC ........... 205/701; 205/742; 204/262; 204/274; 204/275.1
(58) Field of Classification Search ............. 204/262, 204/274, 275.1, 701, 742
 See application file for complete search history.

(56) References Cited

U.S. PATENT DOCUMENTS

| 4,152,238 | A | * | 5/1979 | Okazaki | 204/228.1 |
| 4,529,868 | A |   | 7/1985 | Bowen | |
| 5,314,589 | A | * | 5/1994 | Hawley | 205/618 |
| 6,555,055 | B1 | * | 4/2003 | Cisar et al. | 205/701 |
| 7,335,291 | B2 | * | 2/2008 | Kondo et al. | 205/701 |

FOREIGN PATENT DOCUMENTS

| JP | 11-226092 A | 8/1999 |
| JP | 2007-267975 A | 10/2007 |

* cited by examiner

*Primary Examiner* — Arun S Phasge
(74) *Attorney, Agent, or Firm* — Cantor Colburn LLP

(57) ABSTRACT

Provided is an electrolytic disinfection system and method for purifying water. The electrolytic disinfection system includes; an electrolytic disinfection device which includes; a chamber, a first electrode disposed in the chamber, a second electrode disposed in the chamber and spaced apart from the first electrode, a water inlet part connected to the chamber, wherein the water inlet part allows influent water to be introduced to the chamber therethrough, and a water outlet part connected to the chamber, wherein the water outlet part allows the influent water to be discharged from the chamber therethrough, and an influent water heating device which is disposed upstream of the water inlet part and heats the influent water introduced to the chamber through the water inlet part.

11 Claims, 3 Drawing Sheets

ELECTROLYTIC DISINFECTION SYSTEM AND METHOD FOR PURIFYING WATER

CROSS-REFERENCE TO RELATED APPLICATION

This application claims priority to Korean Patent Application No. 10-2009-0104428, filed on Oct. 30, 2009, and all the benefits accruing therefrom under 35 U.S.C. §119, the content of which in its entirety is herein incorporated by reference.

BACKGROUND

1. Field

The present disclosure relates to electrolytic disinfection systems and methods for purifying water, and more particularly, to an electrolytic disinfection system and method for purifying water that may enhance electrolytic disinfection efficiency of an electrolytic disinfection device that generates oxidant compounds as power is supplied to the electrolytic disinfection device.

2. Description of the Related Art

Most typical water purifying devices for home use include at least one activated carbon filter to remove chlorine, taste, smell, and disinfection byproducts from tap water. Such an activated carbon filter may efficiently filter microorganisms in the initial stage of use. However, since there is no mechanism for inactivating, e.g., destroying, microorganisms, microorganisms may become attached to the activated carbon and may proliferate after a predetermined period of time, thereby increasing the possibility of discharging contaminants from the water purifying device. Therefore, the activated carbon filters in a typical water purifying device are required to be periodically replaced. An average replacement cycle is about 2 months, and maintenance of the water purifying device is difficult and expensive, and the costs of managing the water purifying device is increased due to the continual replacement of the activated carbon filters.

Accordingly, electrolytic disinfection methods have been experimentally implemented in recent years.

Electrolytic disinfection is a water purifying technology for inactivating microorganisms present in water by generating a potential difference between two electrodes so that the water molecule is split, i.e., hydrolyzed, and various oxidizing agents are formed thereby.

Oxidant compounds including reactive oxygen species ("ROS"), such as chlorine ($Cl_2$), hypochlorite ions ($OCl^-$), hydroxyl (OH) radicals, hydrogen peroxide ($H_2O_2$), and ozone ($O_3$), various ions and radical species for sterilization are generated in the water which has undergone hydrolysis.

Chemical agents may alternatively be used. For example, a chlorine-based oxidizing agent, such as hypochlorous acid, chlorine or chlorine dioxide, and an oxygen-based oxidizing agent, such as hydrogen peroxide, ozone or hydroxyl radical, are the most effective cleansing agents currently used for cleaning household or industrial products. Such oxidant molecules having a strong oxidation potential are applied to various fields, including disinfection and sterilization. Since electrolyte disinfection devices performing electrolysis as described above may be effectively applied to water disinfection and sterilization, they are advantageous in that they have higher disinfection efficiency, are safer, are easier to operate, and have lower costs than general methods using a chemical agent.

However, if contamination is severe, the amount of voltage and current, the concentration of an electrolytic solution, and an electrolysis reaction time are all increased in order to achieve a same level of sterilization as when the contamination is less severe, thereby greatly increasing energy consumption and a processing time and making it possible to corrode an electrolytic disinfection system.

Accordingly, there is an increasing demand for an electrolytic disinfection system that may enhance electrolytic disinfection efficiency under electrolysis conditions.

SUMMARY

Provided are electrolytic disinfection systems and methods for purifying water that may enhance disinfection efficiency.

Additional aspects will be set forth in part in the description which follows and, in part, will be apparent from the description, or may be learned by practice of the presented embodiments.

According to an aspect of the present disclosure, an embodiment of an electrolytic disinfection system includes; an electrolytic disinfection device which includes; a chamber, a first electrode disposed in the chamber, a second electrode disposed in the chamber and spaced apart from the first electrode a water inlet part connected to the chamber, wherein the water inlet part allows influent water to be introduced to the chamber therethrough, and a water outlet part connected to the chamber, wherein the water outlet part allows the influent water to be discharged from the chamber therethrough, and an influent water heating device which is disposed upstream of the water inlet part and heats the influent water introduced to the chamber through the water inlet part.

In one embodiment, the influent water heating device may be a constant temperature heating device.

In one embodiment, a heating temperature of the influent water heating device may be within a range from about 20° C. to about 70° C. In one embodiment, the influent water heating device may be at least one of a positive temperature coefficient ("PTC") thermistor heating device, an electric heater, a gas heater, a heat exchanger, a hot water pipe, or a heating device using waste heat. In one embodiment, there is a heating device using waste heat, for example, heat generated in a condenser or a compressor of a refrigerator.

In one embodiment, the PTC thermistor heating device may include a PTC thermistor hot wire having a Curie temperature that ranges from about 20° C. to about 120° C.

In one embodiment, each of the first electrode and the second electrode may include a material selected from the group consisting of activated carbon, a metal, a metal oxide and combinations thereof. In one embodiment, the metal may be selected from the group consisting of platinum, ruthenium, stainless alloy, titanium, iridium, tantalum, iron, copper, aluminum, silver, gold, tin, lead, zinc and combinations thereof.

In one embodiment, the electrolytic disinfection system may further include a voltage applying device that applies a positive (+) voltage and a negative (−) voltage to the first electrode and the second electrode, respectively.

In one embodiment, the voltage applying device may apply a voltage which is sufficient to electrolyze water between the first electrode and the second electrode.

In one embodiment, the voltage applying device alternately may apply a positive (+) voltage and a negative (−) voltage to the first electrode and respectively supply a voltage having an opposite polarity to the second electrode.

In one embodiment, the influent water heating device may be a PTC thermistor heating device or an electric heater, and the voltage applying device supplies power to the influent water heating device.

According to another aspect of the present disclosure, there is provided an electrolytic disinfection method for electrolyzing influent water, the method including; heating the influent water, and electrolyzing the heated influent water by applying a voltage to a first electrode and a second electrode spaced apart from the first electrode.

In one embodiment, the heating of the influent water may include maintaining a temperature of the influent water in a range from about 20° C. to about 70° C.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
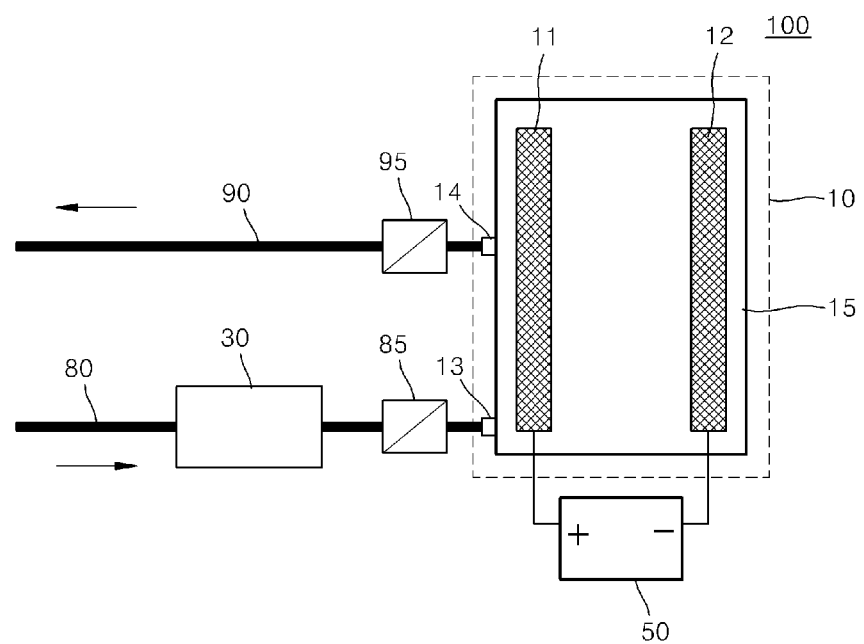
FIG. 1 is a cross-sectional view of an embodiment of an electrolytic disinfection system according to the present disclosure.

Embodiments now will be described more fully hereinafter with reference to the accompanying drawings, in which embodiments of the invention are shown. The embodiments may, however, be embodied in many different forms and should not be construed as limited to the embodiments set forth herein. Rather, these embodiments are provided so that this disclosure will be thorough and complete, and will fully convey the scope of the embodiments to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting thereof. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the disclosure.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope thereof unless otherwise claimed. No language in the specification should be construed as indicating any non-claimed element as essential to the practice of the embodiments as used herein.

Hereinafter, the embodiments will be described in detail with reference to the accompanying drawings.

FIG. 1 is a cross-sectional view of an embodiment of an electrolytic disinfection system 100 according to the present disclosure.

Referring to FIG. 1, the present embodiment of an electrolytic disinfection system 100 includes an electrolytic disinfection device 10 and an influent water heating device 30.

The electrolytic disinfection device 10 includes a chamber 15, a first electrode 11 disposed in the chamber 15 and a second electrode 12 also disposed in the chamber 15 and spaced apart from the first electrode 11, a water inlet part 13 disposed at a first side of the chamber 15 and a water outlet part 14 separated from the water inlet part 13. In one embodiment (not shown), the water inlet part 13 may be disposed on an opposite side from the water outlet part 14. An influent water pipe 80 through which a fluid to be disinfected flows may be connected by a joint 85 to the water inlet part 13 of the electrolytic disinfection device 10, and an effluent water pipe 90 through which disinfected water flows may be connected by another joint 95 to the water outlet part 14.

The first electrode 11 and the second electrode 12 may be a variety of well-known electrodes. For example, embodiments of each of the first electrode 11 and the second electrode 12 may be formed of a metal or a metal oxide. The metal may be any one selected from the group consisting of platinum, ruthenium, stainless alloy, titanium, iridium, tantalum, iron, copper, aluminium, silver, gold, tin, lead, zinc, an alloy thereof, other materials having similar characteristics, or a combination thereof. Alternatively, each of the first electrode 11 and the second electrode 12 may be formed of a conductive material such as activated carbon or other materials having similar characteristics. A current collector (not shown), such as a graphite foil, may be further provided in order to reduce the electrical resistance of each of the first and second electrodes 11 and 12.

The influent water heating device 30 for heating influent water before electrolytic disinfection is disposed in front of, e.g., upstream of, the water inlet part 13 of the electrolytic disinfection device 10. For example, the influent water heating device 30 may surround the influent water pipe 80 or may be inserted into the influent water pipe 80. Embodiments include configurations wherein the influent water heating device 30 may be fixed to the influent water pipe 80, or may be detachable from the influent water pipe 80. The influent water heating device 30 may heat the influent water at a constant temperature within, for example, about 20° C. to about 70° C. The influent water heating device 30 may be any one of various common heating devices capable of heating the influent water. For example, embodiments include configurations wherein the influent water heating device 30 may be a positive temperature coefficient ("PTC") thermistor heating device, an electric heater, a gas heater, a heat exchanger, a hot water pipe, a device for generating waste heat or other similar devices. For example, if the electrolytic disinfection system 100 of FIG. 1 is applied as a water purifying system of a dispenser of a refrigerator, the influent water may be heated before electrolytic disinfection and the heating may be performed using waste heat generated by a condenser or a compressor of the refrigerator. In one embodiment, the influent water heating device 30 may further include a temperature control unit for maintaining the influent water at a constant temperature. The temperature control unit may be a well-known control unit, and may be integrally coupled to a heating unit like a PTC thermistor heating device, which will be described in more detail later.

The electrolytic disinfection system 100 may further include a voltage applying device 50 for applying a voltage to the first and second electrodes 11 and 12. Embodiments include configurations wherein the voltage applying device 50 may be disposed inside or outside the electrolytic disinfection device 10. The voltage applying device 50 may apply a voltage that is sufficient to electrolyze water between the first and second electrodes 11 and 12. For example, in one embodiment the voltage applying device 50 may perform a constant voltage applying function by supplying a positive voltage to the first electrode 11 and a negative voltage to the second electrode 12. Since surfaces of microorganisms in a neutral pH solution are generally negatively charged, microorganisms are attracted to and adsorbed onto the first electrode 11 or the second electrode 12 when a positive voltage is applied thereto, and then when a negative voltage is subsequently applied thereto, adsorbed microorganisms thereon may be desorbed therefrom due to electrostatic repulsion. When a microorganism is adsorbed onto one of the first and second electrodes 11 and 12, a cell wall of the microorganism may be damaged by the electrical interaction with the oppositely charged electrode. In addition, the microorganism may be damaged or destroyed through interaction with radicals produced by the electrolysis operation. The microorganism disinfection process will be described in more detail below. Accordingly, the voltage applying device 50 may achieve both disinfection and desorption by alternately supplying a negative voltage to the first electrode 11 and a positive voltage to the second electrode 12. If a PTC thermistor heating device or an electric heater is used as the influent water heating device 30, the voltage applying device 50 may be used as a power supply device for the influent water heating device 30 as well as the first and second electrodes 11 and 12.

The operation of the electrolytic disinfection system 100 and an electrolytic disinfection method using the electrolytic disinfection system 100 will now be explained.

Influent water is introduced into the chamber 15 through the water inlet part 13, and is discharged through the water outlet part 14 of the chamber 15. The influent water introduced into the chamber 15 may be electrolyzed due to power supplied to the first and second electrodes 11 and 12 to obtain electrolyzed water. That is, an electrical potential difference sufficient to electrolyze water is applied between the first electrode 11 and the second electrode 12.

For example, if a positive (+) voltage is applied to one of the first electrode 11 and the second electrode 12, disinfection may be carried out due to direct oxidation, which may remove electrons from adsorbed microorganisms or organic materials. Also, when water is electrolyzed by applying electric power to the first and second electrodes 11 and 12, reactive oxygen species ("ROS"), such as hydroxyl (OH) radical, hydrogen peroxide ($H_2O_2$), and ozone ($O_3$), are formed and disinfection may be carried out due to the ROS. In addition, if chloride ions ($Cl^-$) ions are present in the influent water, disinfection may be carried out due to the interaction of hypochlorous acid (HOCl or $OCl^-$), which may be formed by the electrolysis, and the microorganism. Since oxidant compounds, such as ROS and hypochlorous acid (HOCl or $OCl^-$), function as cleansing agents, the electrolytic disinfection system 100 of FIG. 1 may not only disinfect the influent water but also sterilize medical equipment using the electrolyzed influent water.

The electrical conductivity of the electrolyzed water during the electrolysis process increases as the temperature of the electrolyzed water increases, and therefore a rate at which disinfectants are formed during the electrolysis process increases, if all other electrolysis conditions remain the same, e.g., even if the electrolyzed water and the same electric power are used. Typically, as the temperature of electrolyzed water increases by about 1° C., the electrical conductivity of the electrolyzed water increases by about 2%. Accordingly, by increasing the temperature of the electrolyzed water, more disinfectants may be obtained using the same amount of electrolyzed water and power, and thus a disinfection time may also be reduced. Also, according to the Arrhenius equation, $k=Ae^{-Ea/RT}$ (wherein k is a reaction rate constant, A is a frequency factor, $E_a$ is an activation energy, R is a gas constant, and T is an absolute temperature), most general chemical reaction rates increase as a response to a temperature increase. That is, a disinfection rate increases as a reaction rate between electrolyzing materials and microorganisms increases.

Accordingly, the present embodiment of an electrolytic disinfection method according to the present disclosure enhances disinfection efficiency by increasing a temperature of the influent water to increase a chemical response rate and an electrolysis response rate in the electrolytic disinfection device. In at least some of the embodiments described above, any disinfection due directly to heating is negligible or non-existent.

When the temperature of the influent water is increased by the influent water heating device 30, an electrolysis reaction rate is increased, the number of oxidizing agents formed under the same electrolysis conditions is increased, and the chemical reaction rate of the formed oxidizing agents is increased, thereby enhancing disinfection efficiency.

As described above, the electrolytic disinfection method enhances electrolytic disinfection efficiency when performing electrolysis on the influent water in the electrolytic disinfection device 10 by first heating the influent water before introducing the water into the electrolytic disinfection device 10.

Although the disinfection efficiency increases as the temperature of the influent water increases, if the temperature of the influent water is too high, energy consumption by the influent water heating device 30 may be high and the oxidizing agents formed in the influent water may evaporated, and thus concentration of the oxidizing agents may be lower than a maximum value. Thus, in order to keep energy consumption down and to maximize oxidizing agent concentration, the temperature of the water may be controlled to be within a predetermined critical range. Considering this, the temperature of the influent water may be adjusted to be within a range, for example, from about 20° C. to about 70° C.

Since surfaces of microorganisms in a neutral pH solution are generally negatively charged, adsorbed microorganisms may be desorbed from the first electrode 11 or the second electrode 12 due to electrostatic repulsion when a negative (−) voltage is applied to the first electrode 11 or the second electrode 12. Accordingly, the voltage applying device 50 may achieve both disinfection and desorption by alternately applying a positive (+) voltage and a negative (−) voltage to the first electrode 11 and respectively applying a voltage having an opposite polarity to the second electrode 11.

Figure 2:
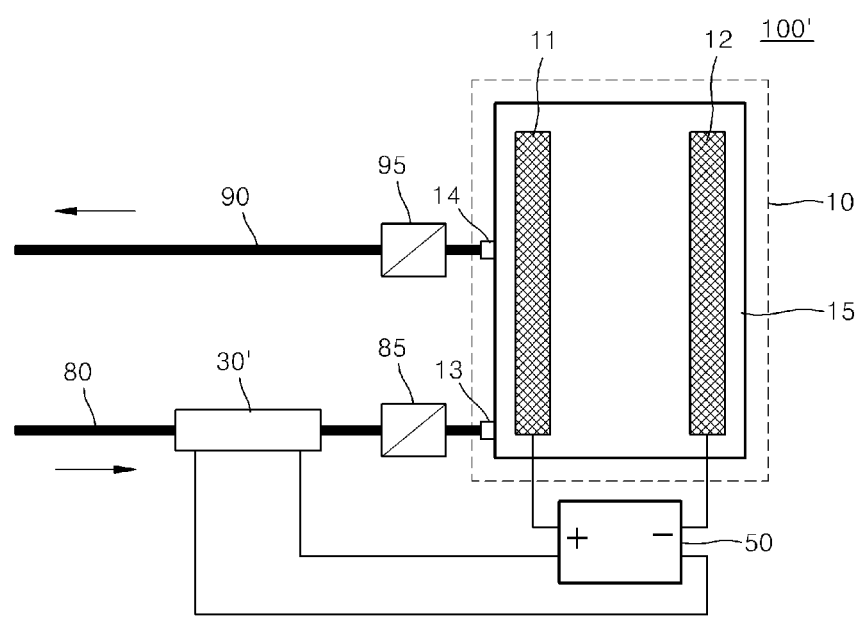
FIG. 2 is a cross-sectional view illustrating another embodiment of an electrolytic disinfection system including a positive temperature coefficient ("PTC") thermistor heating device used as an influent water heating device.
Figure 3:
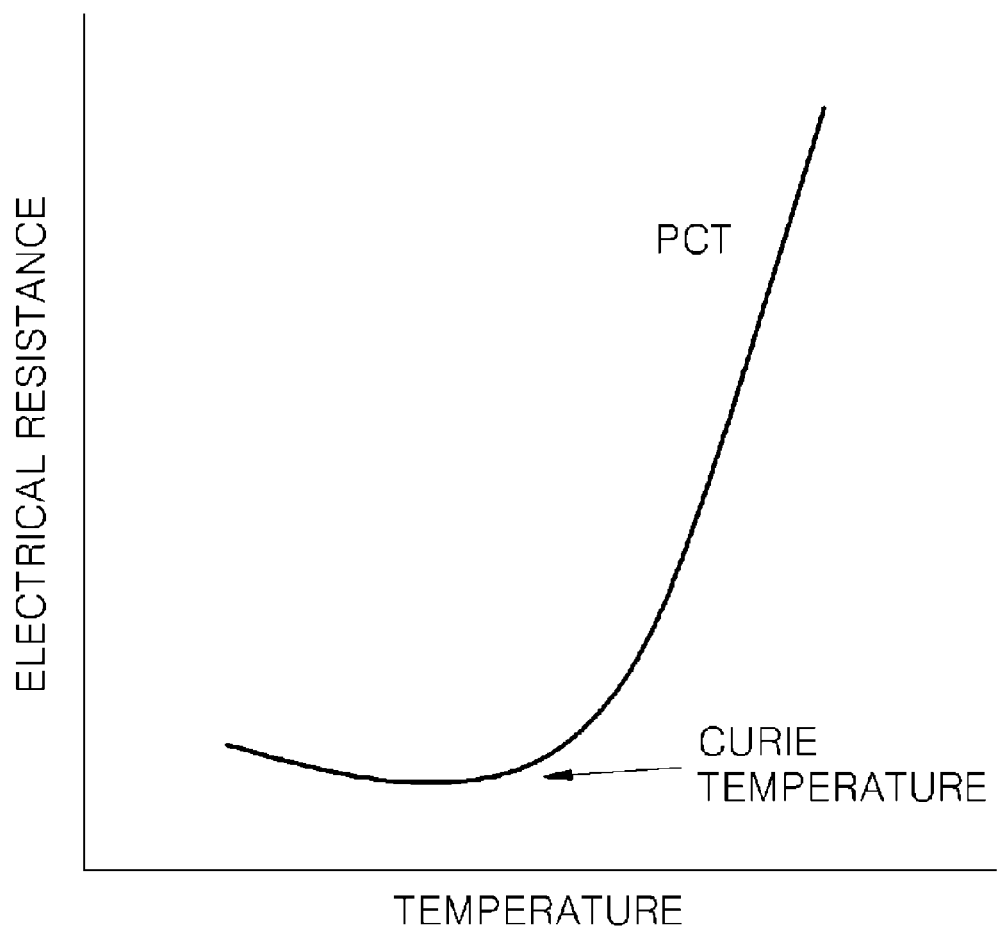
FIG. 3 is a graph illustrating a relationship between an electrical resistance and a temperature of the PTC thermistor heating device of FIG. 2.

FIG. 2 is a cross-sectional view illustrating another embodiment of an electrolytic disinfection system including a PTC thermistor heating device 30' used as an influent water heating device 30. FIG. 3 is a graph illustrating a relationship between the electrical resistance and the temperature of the PTC thermistor heating device 30 or 30' of FIG. 1 or 2.

Referring to FIG. 2, an electrolytic disinfection system 100' further includes the electrolytic disinfection device 10, the PTC thermistor heating device 30', and the voltage applying device 50. Except for the fact that the PTC thermistor heating device 30' is used as the influent water heating device 30, the electrolytic disinfection system 100' of FIG. 2 is substantially the same as the electrolytic disinfection system 100 of FIG. 1.

The PTC thermistor heating device 30' is a heating device for generating heat by supplying power to a PTC thermistor, which is a thermally sensitive semiconductor. Embodiments include configurations wherein the PTC thermistor may be fixed to one or more sides of the influent water pipe 80 in the form of a hot wire, or may be inserted into the influent water pipe 80. In one embodiment, the PTC thermistor heating device 30' may be connected to the voltage applying device 50 for electrolysis to be supplied with power, although alternative embodiments include configurations wherein the PTC thermistor heating device 30' may be connected to a separate voltage applying device (not shown). Since the voltage applying device 50 of the electrolytic disinfection device 10 is also used to supply power to the PTC thermistor heating device 30', the configuration of the electrolytic disinfection system 100' may be simplified and unnecessary power consumption may be reduced by supplying power at the same time as when electrolytic disinfection is started and by cutting off power supply when the electrolytic disinfection is terminated.

Referring to FIG. 3, the electrical resistance of the PTC thermistor drastically increases when the temperature of the PTC thermistor is higher than the Curie temperature of the PTC thermistor. That is, when the temperature of the PTC thermistor is lower than the Curie temperature, the electrical resistance of the PTC thermistor is relatively low, a relatively large amount of current flows, and Joule heat is generated. In fact, the electrical resistance of the PTC thermistor actually decreases in a region where the temperature approaches the Curie temperature. When the temperature of the PTC thermistor is higher than the Curie temperature, however, the electrical resistance of the PTC thermistor is drastically increased and relatively little current flows therethrough. Accordingly, if the PTC thermistor is used as a heating device, temperature may be maintained around the Curie temperature without using any temperature control device simply due to the large electrical resistance of the PTC thermistor at temperatures greater than the Curie temperature which acts as a feedback system to prevent the temperature from increasing. Since the PTC thermistor heating device 30' of FIG. 2 may integrate a heating unit with a temperature control unit using these characteristics of the PTC thermistor, a relatively constant temperature may be maintained without using a separate temperature sensor for regulating the temperature of the influent water. The Curie temperature of the PTC thermistor may vary from tens to hundreds of degrees Centigrade according to the type of semiconductor material used to form the PTC thermistor. In one embodiment the PTC thermistor heating device 30' may use a PTC thermistor having a Curie temperature within a range, for example, from about 20° C. to about 120° C. In one embodiment, the PTC thermistor heating device 30' may use a PTC thermistor having a Curie temperature within a range from about 20° C. to about 70° C.

Table 1 shows experimental data of the amount of chlorine generated according to the temperature of the influent water in the electrolytic disinfection system 100 or 100' of FIG. 1 or 2.

In the experiment, a working electrode was a boron-doped diamond ("BDD") electrode, a counter electrode was a platinum (Pt) electrode, and a reference electrode was a silver/silver chloride (Ag/AgCl) electrode. An electrolytic solution, that is, the influent water, was a 10 mM NaCl+100 mM KH2PO4 solution prepared to generate a large amount of chlorine as an oxidizing agent on the electrodes. A constant 4 V was applied for 5 minutes. The amount of chlorine generated varied according to the temperature of the influent water and was measured using diethyl-p-phenylenediamine ("DPD"). Four examples were measured wherein the only variable that was changed between the examples was the temperature of the electrolytic solution.

TABLE 1

|  | Temperature | Chlorine concentration (ppm as $Cl_2$) |
|---|---|---|
| Example 1 | 25° C. | 0.8 |
| Example 2 | 35° C. | 2.5 |
| Example 3 | 40° C. | 4.7 |
| Example 4 | 45° C. | 5.6 |

As shown in Table 1, the amount of chlorine generated varied to a large degree even when only the temperature of the influent water was increased under the same electrolyte concentration and using the same voltage.

While the chlorine concentration of Example 1 was 0.8 ppm at 25° C., the chlorine concentrations of Examples 2, 3, and 4, respectively at 35° C., 40° C., and 45° C., were three, six, and seven times higher than that of Example 1. Accordingly, it is found that if the temperature of the influent water is increased by 20° C. to increase the electrolysis reaction rate, the number of oxidizing agents is increased by six to seven times.

Table 2 shows experimental data of the electrolytic disinfection efficiency according to the temperature of the influent water in the electrolytic disinfection system 100 or 100' of FIG. 1 or 2.

TABLE 2

|  | Operating status of electrolyzed influent water heating device | Influent water temperature | Electrolysis voltage application | Microorganism concentration before disinfection (CFU/ml) | Microorganism concentration after disinfection (CFU/ml) |
|---|---|---|---|---|---|
| Comparative Example 1 | Non-operational | 15° C. | Yes | 91,500 | 8,500 |
| Comparative Example 2 | Operational | 45° C. | No | 90,500 | 102,500 |
| Embodiment 1 | Operational | 25° C. | Yes | 91,000 | 3,700 |
| Embodiment 2 | Operational | 35° C. | Yes | 84,500 | 1,800 |
| Embodiment 3 | Operational | 45° C. | Yes | 102,000 | 100 |

Each of the first and second electrodes 11 and 12 (see FIG. 1) included a 10×10 $cm^2$ activated carbon filter, and the voltage applying device 50 and the influent water heating device 30 were connected to the electrolytic disinfection device 10 including a separator and a graphite foil current collector. Microorganisms used in this experiment were *pseudomonas (P.) aeruginosa* PA01, and the influent water used in this experiment was 500 uS/cm tap water. In this experiment, 100 ml of a *P. aeruginosa* PA01 solution with a high concentration of $10^5$ CFU/ml was electrolyzed by being agitated for 20 minutes at a flow rate of 20 ml/min. In all cases, 5 V/−5 V voltages were applied for 20 minutes in total (reverse voltages were alternately applied every 5 minutes) between the first and second electrodes 11 and 12 (see FIG. 1). The disinfection efficiency of the water before and after this experiment was analyzed by measuring the number of living microorganisms using a spread plate method. The results of this experiment are shown in Table 2.

Comparative Example 1 shows results obtained by applying a voltage only to the electrolytic disinfection device 10, without operating the influent water heating device 30, with a temperature of 15° C., which is the average temperature of tap water. In Comparative Example 1, the microorganism concentration changed from 91,500 CFU/ml before electrolytic disinfection to 8,500 CFU/ml after the electrolytic disinfection.

In Embodiments 1, 2, and 3 showing results obtained by operating the influent water heating device 30 and applying a voltage to the electrolytic disinfection device 100, the number of microorganisms were sharply reduced to 3,700, 1,800, and 100 CFU/ml, respectively, after disinfection as the temperature of the influent water was increased.

In particular, it is found that in Embodiment 3 in which the temperature of the influent water was 45° C., a large number of oxidizing agents were formed, the chemical reaction rate was increased, and the disinfection efficiency was 85 times higher than that of Comparative Example 1 which did not utilize an influent water heating device.

It is found that in Comparative Example 2 in which the temperature of the influent water was 45° C. and no electrolysis voltage was applied, the number of microorganisms after disinfection was higher than the number of microorganisms before the disinfection, thereby having a negative disinfection efficiency.

Although the disinfection efficiency increases as the temperature of the influent water increases in the electrolytic disinfection method according to the present embodiment, if the temperature of the influent water is too high, energy consumption is high and oxidizing agents formed through the electrolysis are evaporated, and thus concentration of oxidizing agents may be lower than a maximum value. Accordingly, the temperature of the influent water may be adjusted to be within a range from about 20° C. to about 70° C.

As described above, the electrolytic disinfection system and method for purifying water according to the present disclosure may enhance the electrolytic disinfection efficiency with a simple configuration and low costs by increasing the temperature of influent water before electrolytic disinfection to increase an electrolysis reaction rate and a disinfection reaction rate in an electrolytic disinfection device.

The electrolytic disinfection system may be applied to various water purifying devices, such as a general household water purifying device, a dispenser of a refrigerator, a kettle-type water purifying device, and a direct tap connection type water purifying device among a variety of other water purifying devices.

Furthermore, the electrolytic disinfection system and method according to the present disclosure may be applied in sterilizing devices for medical use, such as an endoscope disinfection device, in home appliances, such as a washing machine and a humidifier, and in various water purifying devices for industrial use, such as a small-medium sized water purifying device, a swimming pool water purifying device, a cooling tower water purifying device, a ballast water purifying device, a sewage water purifying device among a variety of other water purifying devices.

It should be understood that the embodiments described therein should be considered in a descriptive sense only and not for purposes of limitation. Descriptions of features or aspects within each embodiment should typically be considered as available for other similar features or aspects in other embodiments. Accordingly, the technical scope of the present disclosure should be determined by the attached claims.

What is claimed is:

1. An electrolytic disinfection system comprising:
   an electrolytic disinfection device which comprises:
   a chamber;
   a first electrode disposed in the chamber;
   a second electrode disposed in the chamber and spaced apart from the first electrode;
   a water inlet part connected to the chamber, wherein the water inlet part allows influent water to be introduced to the chamber therethrough; and
   a water outlet part connected to the chamber, wherein the water outlet part allows the influent water to be discharged from the chamber therethrough; and
   an influent water heating device which is disposed upstream of the water inlet part and heats the influent water introduced to the chamber through the water inlet part,
   wherein the influent water heating device is a positive temperature coefficient thermistor heating device, and
   wherein the positive temperature coefficient thermistor heating device comprises a positive temperature coefficient thermistor hot wire which has a Curie temperature within a range from about 20° C. to about 120° C.

2. The electrolytic disinfection system of claim 1, wherein the influent water heating device is a constant temperature heating device.

3. The electrolytic disinfection system of claim 2, wherein a heating temperature of the influent water heating device is within a range from about 20° C. to about 70° C.

4. The electrolytic disinfection system of claim 1, wherein each of the first electrode and the second electrode comprises a material selected from a group consisting of activated carbon, a metal, a metal oxide and combinations thereof.

5. The electrolytic disinfection system of claim 4, wherein the metal is selected from a group consisting of platinum, ruthenium, a stainless alloy, titanium, iridium, tantalum, iron, copper, aluminum, silver, gold, tin, lead, zinc and combinations thereof.

6. The electrolytic disinfection system of claim 1, further comprising a voltage applying device which creates an electrical potential difference between the first electrode and the second electrode.

7. The electrolytic disinfection system of claim 6, wherein the voltage applying device constantly applies a positive voltage and a negative voltage to the first electrode and the second electrode, respectively.

8. The electrolytic disinfection system of claim 6, wherein the voltage applying device applies a voltage which is sufficient to electrolyze water between the first electrode and the second electrode.

9. The electrolytic disinfection system of claim 6, wherein the voltage applying device alternately applies a positive voltage and a negative voltage to the first electrode and respectively supplies a voltage having an opposite polarity to the second electrode.

10. An electrolytic disinfection method for electrolyzing influent water, the method comprising:
    heating the influent water; and
    electrolyzing the heated influent water by applying a voltage to a first electrode and a second electrode spaced apart from the first electrode,
    wherein the influent water heating device is a positive temperature coefficient thermistor heating device, and
    wherein the positive temperature coefficient thermistor heating device comprises a positive temperature coefficient thermistor hot wire which has a Curie temperature within a range from about 20° C. to about 120° C.

11. The method of claim 10, wherein the heating of the influent water comprises maintaining a temperature of the influent water to be within a range from about 20° C. to about 70° C.

* * * * *